United States Patent [19]

McCusker et al.

[11] Patent Number: 4,966,530

[45] Date of Patent: Oct. 30, 1990

[54] HYDRAULIC PUMP AND MOTOR ASSEMBLIES FOR VEHICLE HYDRAULIC SYSTEMS

[75] Inventors: Redmond McCusker, Birmingham, England; Helmut Heibel, Moschheim; Leo Gilles, Koblenz, both of Fed. Rep. of Germany

[73] Assignee: 501 Lucas Industries Public Ltd. Company, Birmingham, England

[21] Appl. No.: 389,062

[22] Filed: Aug. 3, 1989

[30] Foreign Application Priority Data

Aug. 9, 1988 [GB] United Kingdom ................. 8818912

[51] Int. Cl.$^5$ .......................... B05D 3/00; B05D 3/12
[52] U.S. Cl. ..................................... 417/273; 417/360
[58] Field of Search ................... 417/273, 360

[56] References Cited

U.S. PATENT DOCUMENTS

| | | | |
|---|---|---|---|
| 2,309,551 | 1/1943 | Trapp et al. | 417/273 |
| 3,000,319 | 9/1961 | Tuck | 417/273 |
| 3,620,649 | 11/1971 | Cary | 417/360 |
| 4,629,401 | 12/1986 | Grote | 417/273 |

Primary Examiner—A. Michael Chambers

[57] ABSTRACT

An hydraulic pump and motor assembly for a vehicle hydraulic system has a housing accommodating the pump and motor, the pump having one or more spring-loaded pistons working in complementary bores to pump hydraulic fluid from a reservoir port to a delivery port, and the pistons being operated from an eccentric on a rotary output shaft of the motor through a cam bearing assembly. The assembly includes a retaining device for the pistons to limit their radially inwards movement, when the motor output shaft is removed, to an amount which is insufficient to break the hydraulic circuit containing the pistons. This enables the motor to be removed, while ensuring that the pistons are retained in their bores so that the hydraulic circuit remains intact. The cam bearing assembly may be mounted on the shaft without being retained on it, with the engagement between the pistons and the cam bearing assembly arranged so that they are all retained in the housing on withdrawal of the output shaft. Alternatively the cam bearing assembly may be withdrawn with the shaft, the pistons being retained by stop devices located in the bores.

12 Claims, 3 Drawing Sheets

HYDRAULIC PUMP AND MOTOR ASSEMBLIES FOR VEHICLE HYDRAULIC SYSTEMS

This invention relates to an hydraulic pump and motor assembly for a vehicle hydraulic system of the kind having a housing accommodating the pump and the motor, the pump having spring-loaded piston means working in bore means in the housing to pump hydraulic fluid in an hydraulic circuit from a reservoir port to a delivery port, the piston means being operated from an eccentric on a rotary output shaft of the motor through cam bearing means mounted on the eccentric.

Assemblies of the kind set forth are commonly used in vehicle anti-skid braking systems, the motor being an electric motor operating the pump, whose output is used during anti-skid operation on receipt of a skid signal, for reapplication of the brakes following skid correction or to charge an hydraulic accumulator, which operates the anti-skid system and other vehicle services. During manufacture, the pump and the motor are assembled in the housing, with the cam bearing means located on the motor output shaft, on which it is held by a retainer provided on the free end of the shaft, in order to prevent axial movement of the bearing on the shaft. The assembly is then installed in the vehicle, where it is connected to the rest of the hydraulic system, which is bled. Problems may arise subsequently if the motor needs repair or servicing, as this requires removal of the whole assembly, and then re-installation and re-bleeding which is time-consuming and awkward. It is not advisable just to remove the motor, as the cam bearing means will be removed with the shaft, allowing the springs to move the piston means out of the bore means, which breaks the hydraulic circuit. Any hydraulic fluid that leaks out as a result is liable to corrode the assembly, and the hydraulic system will still need re-bleeding.

According to the present invention, an hydraulic pump and motor assembly of the kind set forth incorporates retaining means for the piston means, to limit radially inwards movement of the piston means, when the motor output shaft is withdrawn from the housing, to an amount insufficient to break the hydraulic circuit.

This has the advantage of enabling the motor to be removed by itself for servicing or repair, as the piston means are retained in their bore means, and the hydraulic circuit remains intact.

The assembly may include means, provided on the side of the cam bearing means remote from the motor, limiting axial movement of the bearing means on the shaft without retaining it thereon, with the retaining means provided by the engagement between the cam bearing means and the piston means, which is so constructed and arranged that the cam bearing means and the piston means are retained in the housing when the motor output shaft is withdrawn. The engagement between the cam bearing means and the piston means serves to retain the cam bearing means in the housing when the motor is removed, and the cam bearing means in turn retains the piston means in the bore means.

Conveniently, the engagement between the cam bearing means and the piston means is a frictional engagement. In a modification, the cam bearing means includes a flange on the side remote from the motor, and engaging with the piston means to provide positive retention of the cam bearing means. In a further modification the engagement is provided by complementary curved surfaces on the cam bearing means and the piston means.

The means limiting axial movement of the cam bearing means preferably comprises a thrust washer, which floats in the housing. Alternatively, the housing itself may be adapted to limit the axial movement of the cam bearing means. In a further modification, the engagement between the cam bearing means and the piston means may limit the axial movement, by means of flanges on the cam bearing means, or the complementary curved surfaces.

In an alternative arrangement, the cam bearing means is held on the motor output shaft, and the retaining means comprises stop means with which the piston means is adapted to engage on withdrawal of the motor output shaft to limit the radially inward movement. Thus, the cam bearing means is withdrawn with the motor output shaft, but the piston means is retained by its engagement with the stop means. Preferably, the stop means comprises clip means located in the bore means, and adapted to engage with shoulder means on the piston means. One or more pins may be used instead of the clip means.

The cam bearing means conveniently comprises a cam ring engaging with the piston means, the ring being mounted on the motor shaft by rollers. The piston means may comprise a pair of pistons located in separate bores in the housing, each piston being in engagement with and operated by the cam ring.

Various embodiments of the invention are illustrated in the accompanying drawings, in which.

Figure 1:
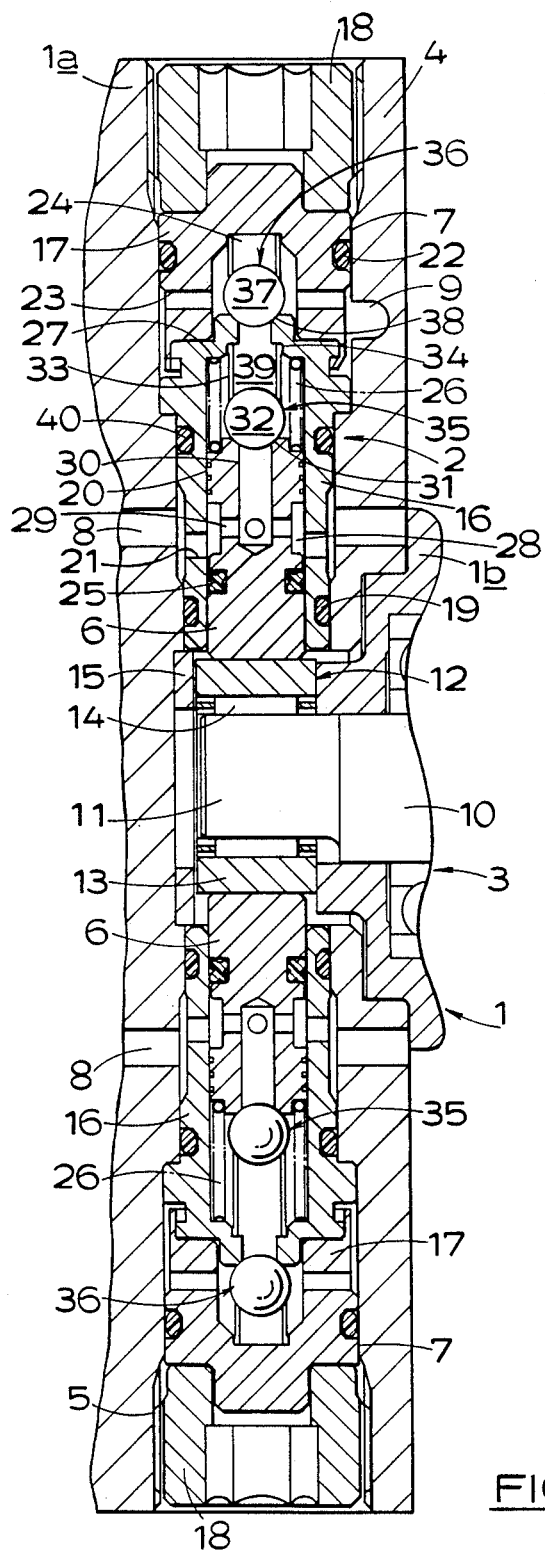
FIG. 1 is a longitudinal section through part of an hydraulic pump and motor assembly.

The hydraulic pump and motor assembly shown in FIG. 1 is adapted for use in a vehicle hydraulic anti-skid braking system (not shown) It comprises a housing 1 in which are located a pump 2 and motor 3 (only part of which is shown).

The pump 2 is in two parts 4, 5, each having a spring-loaded piston 6 working in a bore 7 in a pump housing part 1a, to pump hydraulic fluid from an inlet port 8 connected to a reservoir (not shown) to a delivery port 9 connected to the brakes or an hydraulic accumulator (not shown). The pistons 6 are operated by the motor 3, which is an electric motor of any suitable type located in a separate motor housing 1b. The motor 3 has a rotary output stub shaft 10, at the free end of which is an eccentric 11, which acts on the pistons 6 through a cam bearing means 12. This comprises a cam ring 13 engaging the pistons 6, and mounted on the eccentric by caged needle rollers 14. Axial movement of the cam bearing means 12 on the shaft 10 is limited by the motor housing on one side, and on the other side by a thrust washer 15 provided in the housing 1a adjacent the free end of the shaft 10. The washer 15 floats in the housing, taking any axial loads on the bearing means 12, and limiting its axial movement, but without retaining it on the shaft 10. The cam ring 13 has a frictional engagement with the pistons 6, so that if the motor 3 and shaft 10 are withdrawn from the assembly, the bearing means 12 is retained by the engagement with the pistons 6, and the bearing means 12 in turn retain the pistons 6 in the bores 7, in their normal positions.

The two parts 4, 5 of the pump 2 have the same construction, although the pistons 6 are of course oppositely-acting, and only one part 4 will be described in detail. The bore 7 in the housing 1a is radially directed, and is stepped. It houses an inner sleeve member 16, and an outer cup member 17, which are held in place by a closure member 18. The sleeve member 16 is sealed in the bore 7 by seals 19,40 and has a stepped through-bore 20 and a pair of ports 21 connecting the inlet port 8 to the bore 20. The cup member 17 is also sealed in the bore 7 by a seal 22, and has a pair of ports 23 connecting its internal space 24 to the delivery port 9. The pump piston 6 works in the bore 20 of the sleeve member 16 through a seal 25, and is biassed inwardly (towards the shaft 10) by a spring 26 acting between the outer end of the piston 6 and a shoulder 27 in the bore 20. The piston 6 has a land 28, which is in permanent communication with the ports 21 and thus the inlet port 8, and radial ports 29 leading from the land 28 to a blind axial bore 30 in the piston 6. The bore 30 terminates in a seat 31 for a ball valve member 32, which is biassed towards the seat 31 by a spring 33 abutting a second shoulder 34 in the bore 20. The ball 32 and seat 31 form a first one-way valve 35. A second one-way valve 36 is provided at the outer end of the bore 20, by a spring-loaded ball 37 engageable with a seat 38. The portion of the bore 20 between the one way valves 35, 36 forms a pump chamber 39, which can be connected either to the inlet port 8 or the delivery port 9.

During manufacture, the motor 3, including the cam bearing means 12, is assembled into the housing 1b, which is secured to the housing 1a, and then the components of the pump 2 are assembled into the housing 1a as shown. The assembly can then be installed in a vehicle, and connected to the rest of the hydraulic system, which is bled, so that it is ready for operation.

In operation, the actuation of the electric motor 3 rotates the shaft 10, so that the cam bearing 12 operates to reciprocate the pistons 6 against the loading in the springs 26. Each piston 6, on the outward stroke caused by the cam ring 13, acts to pump fluid from the pump chamber 39 to the delivery port 9 through the one-way valve 36, with the valve 35 closed, and on the inward stroke draws fluid from the inlet port 8 into the chamber 39 through the valve 35, with the valve 36 closed. The fluid is delivered to an accumulator, where it is used for the anti-skid system, for re-application of the brakes following correction of a skid, and for other vehicle services.

If the motor 3 requires repair or servicing, the housing 1b is detached, and the motor 3 and shaft 10 are withdrawn. The cam bearing means 12 however is retained in the housing 1a by its frictional engagement with the pistons 6, and thus serves to keep the pistons 6 in their bores 7. This means that the hydraulic circuit containing the pump 2 is kept intact, so that there is no danger of leakage of hydraulic fluid and no need to bleed the hydraulic system again.

Figure 2:
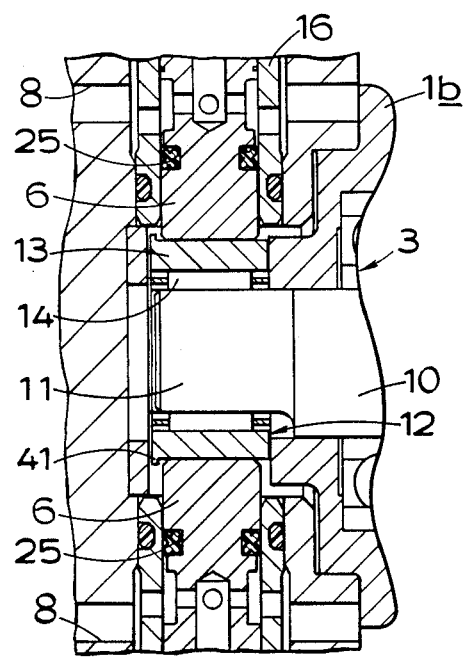
FIGS. 2,3 and 4 show modifications to the assembly of FIG. 1.
Figure 3:
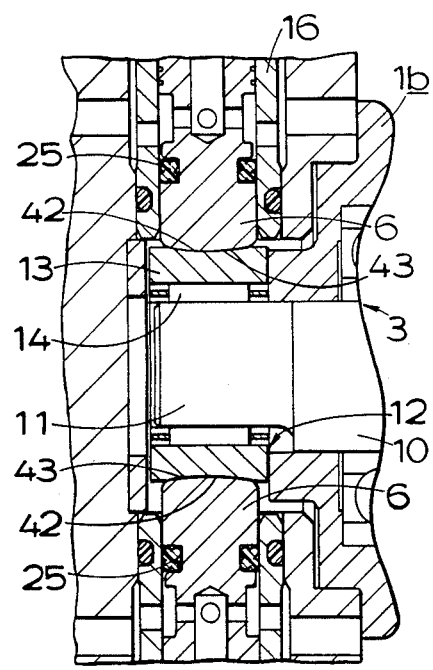
Figure 4:
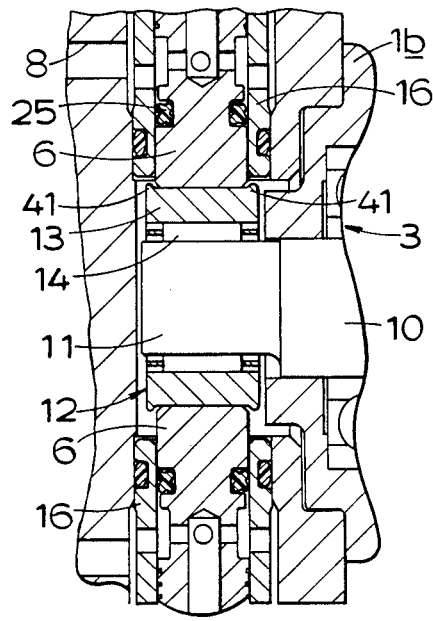

The assembly of FIG. 1 relies on the frictional engagement between the cam ring 13 and the pistons 6 to retain the cam bearing 12. In some installations it may be preferable to provide an engagement with a more positive retention of the cam bearing 12, and FIGS. 2 to 4 show part of the assembly with modifications which achieve this. Corresponding reference numerals have been applied to corresponding parts.

In FIG. 2 the cam ring 13 is provided with a small outwardly-extending flange 41 on the side remote from the motor 3. The flange 41 engages with the pistons 6 to prevent removal of the bearing means 12 with the motor shaft 10. If required, it can be pulled out past the pistons 6 following removal of the shaft 10.

In FIG. 3 the pistons 6 are provided with curved inner ends 42, which engage with complementary curved surfaces 43 on the cam ring 13. These perform a similar function to the flange 41 of FIG. 2.

In a further modification of FIGS. 1 to 3, not shown, the thrust washer 15 may be omitted, and the housing 1a adapted to perform the same function. In this event the housing 1a would be shaped appropriately and the surface engaging the bearing means 12 would be provided with a suitable finish, such as a low-friction coating, to ensure that the bearing means 12 does not wear unduly.

FIG. 4 shows a modification in which the thrust washer 15 is removed, without adapting the housing 1a, as well as providing for positive retention of the cam bearing 12. In FIG. 4, the cam ring 13 is provided with small outwardly-extending flanges 41 on both sides, and there are clearances between the bearing 12 and the motor housing 1b, on one side, and the housing 1a on the other. Axial movement of the cam bearing 12 is limited by its engagement of the flanges 41 with the pistons 6, which take the axial loads on the bearing 12. As in FIG. 2, the flange 41 remote from the motor 3 engages with the pistons 6 to prevent removal of the bearing means 12 with the shaft 10, but if required the bearing means 12 can be pulled out past the pistons 6 following removal of the shaft 10.

In another modification, not shown, to FIG. 3 which provides the same effect as FIG. 4, the radius of the curved ends 42 and surfaces 43 can be reduced so that the engagement between the pistons 6 and the cam ring 13 also limits the axial movement of the cam bearing means 12, and takes the axial load.

The construction, assembly and operation of FIGS. 2 to 4 and the modifications not shown are otherwise the same as those of FIG. 1.

Figure 5:
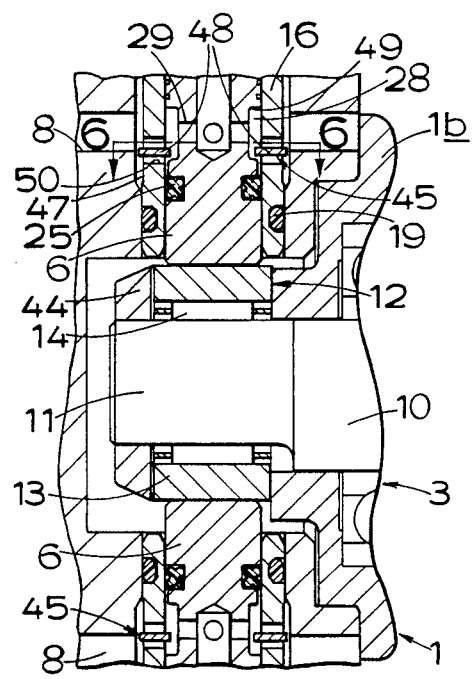
FIG. 5 shows a further modification.
Figure 6:
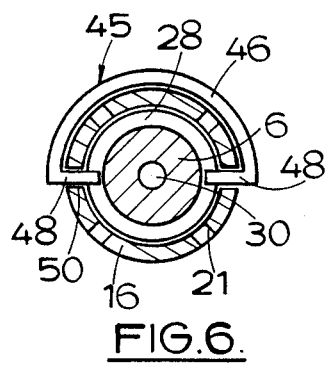
FIG. 6 is a section along the line 6-6 of FIG. 5.

The assembly of FIGS. 5 and 6 shows a modified arrangement of the cam bearing means 12 and the retaining means for the pistons 6. Thus, the thrust washer 15 is omitted, and the shaft 10 is extended, with the cam bearing means 12 held on the shaft 10 by a tapered retaining nut 44 provided on the free end of the shaft 10. The cam bearing means 12 will therefore be withdrawn with the shaft 10, and each piston 6 is retained in its bore 7 by a stop means in the form of a clip 45 located in the sleeve 16. As can be seen in FIG. 6, the clip 45 has a portion 46 of semi-circular outline disposed round the sleeve 16 and accommodated in the annular space 47 between the sleeve 16 and the bore 7, together with cranked ends 48 located in a pair of opposed radial holes 50 in the sleeve 16, the holes 50 being similar to the ports 21. The ends 48 are received in the land 28 in the piston 6, and are adapted to engage with a shoulder 49 formed at the outer end of the land 28. Thus, on withdrawal of the shaft 10 and cam bearing means 12, the engagement of the shoulder 49 with the ends 48 limits the radially inward movement of the piston 6 to an amount which ensures that the seal 25 is still in contact with the sleeve 16, so that the hydraulic circuit remains intact. When the shaft 10 and cam bearing means 12 are replaced, the conical surface on the retaining nut 44 pushes the pistons 6 back into the operative positions shown.

The construction, assembly and operation of the assembly of FIGS. 5 and 6 are otherwise the same as those of FIG. 1, and corresponding reference numerals have been applied to corresponding parts.

Figure 7:
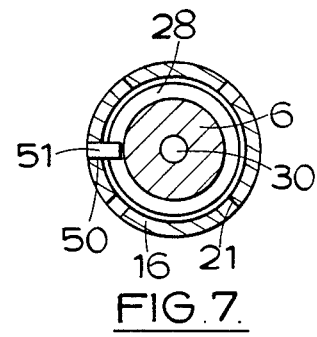
FIG. 7 is similar to FIG. 6, but shows a modification

FIG. 7 shows a further modification in which the stop means comprises a pin 51 instead of the clip 45. The sleeve 16 has a single hole 50, which is smaller in diameter than the ports 21, and the pin 51 is pressed into the hole 50, so that its radially inner end is received in the land 28, for engagement with the shoulder 49 of the piston 6 (in the same way as the ends 48 of the clip 45), in order to retain the piston 6 on withdrawal of the shaft 10 and cam bearing means 12. The pin 51 is inserted at the sub-assembly stage. The construction, assembly and operation of the embodiment of FIG. 7 are otherwise the same as those of FIGS. 5 and 6.

FIG. 7 shows only one pin 51, but of course two or more angularly spaced pins could be provided, each located in a respective hole 50.

What is claimed is:

1. An hydraulic pump and motor assembly for a vehicle hydraulic system, said pump being operated by said motor to pump hydraulic fluid in an hydraulic circuit of said system, said assembly having a housing accommodating said pump and said motor, said pump comprising bore means defined in said housing, together with a reservoir port and a delivery port for connection to said hydraulic circuit, and spring-loaded piston means working in said bore means to pump hydraulic fluid from said reservoir port to said delivery port, said motor having a rotary output shaft, an eccentric mounted on said output shaft, and cam bearing means mounted on said eccentric, with said piston means operated from said eccentric through said cam bearing means, said assembly including retaining means for said piston means to limit radially inwards movement of said piston means in said bore means, when said motor output shaft is withdrawn from said housing, to an amount insufficient to break said hydraulic circuit.

2. An hydraulic pump and motor assembly as claimed in claim 1, wherein said assembly includes means, provided on a side of said cam bearing means remote from said motor, limiting axial movement of said cam bearing means on said shaft without retaining it thereon, said retaining means being provided by an engagement between said cam bearing means and said piston means, said engagement being so constructed and arranged that said cam bearing means and said piston means are retained in said housing when said shaft is withdrawn.

3. An hydraulic pump and motor assembly as claimed in claim 2, wherein said engagement between said cam bearing means and said piston means is a frictional engagement.

4. An hydraulic pump and motor assembly as claimed in claim 2, wherein said cam bearing means includes a flange on said side remote from said motor, said flange engaging with said piston means.

5. An hydraulic pump and motor assembly as claimed in claim 2, wherein said engagement between said cam bearing means and said piston means includes complementary curved surfaces on said cam bearing means and said piston means.

6. An hydraulic pump and motor assembly as claimed in claim 2, wherein said means limiting axial movement of said cam bearing means comprises a thrust washer floating in said housing.

7. An hydraulic pump and motor assembly as claimed in claim 2, wherein said housing limits said axial movement of said cam bearing means.

8. An hydraulic pump and motor assembly as claimed in claim 2, wherein said engagement between said cam bearing means and said piston means limits said axial movement of said cam bearing means.

9. An hydraulic pump and motor assembly as claimed in claim 1, wherein said cam bearing means is held on said motor output shaft, and said retaining means comprises stop means for engagement with said piston means on withdrawal of said motor output shaft, to limit said radially inward movement.

10. An hydraulic pump and motor assembly as claimed in claim 9, wherein said stop means comprises clip means located in said bore means, and said piston means has shoulder means for engagement with said clip means.

11. An hydraulic pump and motor assembly as claimed in claim 9, wherein said stop means comprises one or more pins located in said bore means, and said piston means has shoulder means for engagement with said pins.

12. An hydraulic pump and motor assembly as claimed in claim 1, wherein said cam bearing means comprises a cam ring engaging with said piston means, said ring being mounted on said shaft by rollers, and said piston means comprises a pair of pistons located in separate bores in said housing.

* * * * *

UNITED STATES PATENT AND TRADEMARK OFFICE
CERTIFICATE OF CORRECTION

PATENT NO. : 4,966,530

DATED : October 30, 1990

INVENTOR(S) : Redmond McCusker, et. al.

It is certified that error appears in the above-identified patent and that said Letters Patent is hereby corrected as shown below:

On the Title page, item [73], change the identification of the assignee from "501 Lucas Industries Public Ltd. Company" to --Lucas Industries Public Limited Company --.

Signed and Sealed this

Twenty-fifth Day of May, 1993

Attest:

MICHAEL K. KIRK

Attesting Officer

Acting Commissioner of Patents and Trademarks